Dec. 19, 1967   W. W. CHAMBERS   3,358,738
HEAT RESPONSIVE SWITCH CONTROL
Filed Oct. 24, 1965   2 Sheets-Sheet 1

INVENTOR
William W. Chambers

BY Anthony A. O'Brien
ATTORNEY

INVENTOR
William W. Chambers

BY Anthony R. O'Brien

ATTORNEY

United States Patent Office 3,358,738
Patented Dec. 19, 1967

3,358,738
HEAT RESPONSIVE SWITCH CONTROL
William W. Chambers, Anaheim, Calif., assignor to Robertshaw Controls Company, Richmond, Va., a corporation of Delaware
Filed Oct. 24, 1965, Ser. No. 504,807
9 Claims. (Cl. 158—123)

The present invention relates to a solid state heat responsive switch and its application in control systems, and more particularly, to its application to a pilot flame responsive control system for controlling a flow of gaseous fuel to fuel burning appliances such as used in heating systems, air conditioning systems, hot water heating systems, etc.

Appliances of the type indicated have been provided with thermostatically controlled main valves. Most installations have the main valve or a safety valve operated supplementally by a means responsive to a flame at a pilot burner. Conventional flame responsive means include a bimetal switch in the circuit for the main valve or safety valve, or thermoelectric devices generating a holding current for the electromagnet of the safety valve. The latter provide 100% shut-off, preventing gas flow to the pilot as well as the main burner.

The invention described herein is applicable primarily to systems in which the main valve is prevented from opening, but is also applicable to any system in which the load voltage of 15 volts RMS or higher can be used. The invention utilizes a semiconductor device to provide contactless switching, thus eliminates failures due to misalignment of parts, warping, and corrosion, such as occur in bimetallic switches; or as compared with the thermoelectric system, it eliminates the thermocouple and the critical low voltage characteristics of the millivolt systems, as well as the heavy force which must be held in order to reset the millivolt system devices.

It is thus apparent that the conventional systems utilize a relatively large number of parts, are subject to damage of parts which can result in unsafe operation, are inconvenient to reset, and are high in cost of material assembly and installation.

It is, therefore, an object of the present invention to utilize a hitherto unknown mode of operation of a semiconductor switch to provide a turn-on function at elevated temperatures.

It is another object of this invention to utilize this switch to provide a simple fuel burner safety control system with a flame responsive device that is inexpensive in cost of material, readily assembled and installed, and easy to operate.

Yet another object of the present invention is to eliminate the bimetallic operated switch which uses contacts in high temperature areas with resultant susceptibility to failure of contacts and replace it with contactless semiconductor device.

This invention has another object in that the electric circuit means for the control of main burner apparatus includes a switching semiconductor safety device which becomes non-conductive upon extinguishment of a pilot burner flame.

It is a further object of the present invention to position a four-layer switching diode in a thermal proximity of a pilot burner so as to be in a conductive condition to act as a safety switch.

This invention has a further object in that a four-layer diode is positioned to respond to temperatures generated by a pilot flame for controlling an amplifier, the output of which is utilized to control the operation of fuel burner apparatus.

In accordance with the present invention, a burner control system includes a main burner and a pilot burner which is disposed so that a pilot burner flame ignites the main burner, means for controlling the operation of the main burner, electric circuit means for actuating the controlling means between operative and inoperative positions, and semiconductor means connected in the electric circuit means and being responsive to the pilot burner flame whereby the controlling means is in its inoperative position during absence of the pilot burner flame.

Other objects and advantages of the present invention will become apparent from the following description taken in conjunction with the accompanying drawing wherein.

Figure 1:
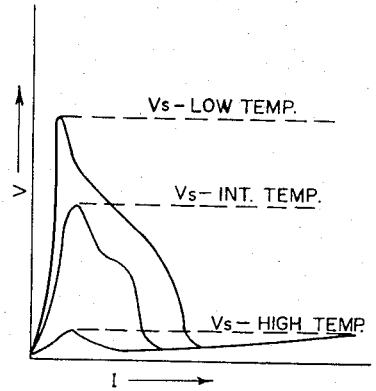
FIG. 1 is a graph showing voltage-current characteristic curves from which the mode of operation of the present invention is derived.
Figure 2:
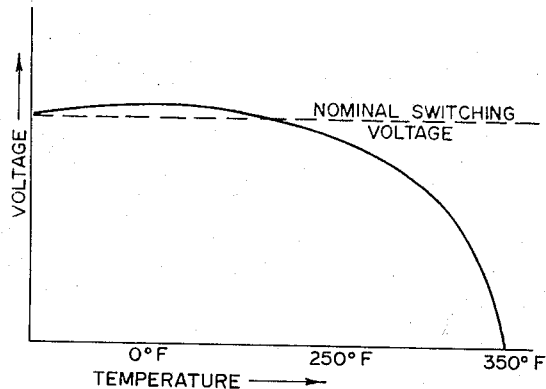
FIG. 2 is a graph showing a voltage-temperature characteristic curve.

Referring now to FIG. 1 which is taken partly from presently published data on the switching (or Shockley) diode and partially an experimental extension of these data for purposes of verifying the mode of operation of this invention, the curves indicate the voltage vs. current characteristic obtained from tests on a typical switching diode at three different temperatures. The curve on FIG. 2 shows the switching voltage vs. temperature for the same typical switching diode. Note that in the curve in FIG. 2 the relatively constant switching voltage is from 0° F. to +250° F. area, which is the range used with the present voltage pulse means of switching, and the sharp decline in voltage at temperatures above 250° F. This shows that the diode can be made conductive, not only by the voltage pulse means used in present practice, but also by the new mode of operation taught in this invention, that is, by raising the temperature to the point at which the switching voltage has dropped to the applied voltage, thus causing the switch to turn ON. Note that the usable ON condition exists between approximately 350° F. at which approximate temperature the switch turns on, and approximately 650° F. above which temperature damage may occur to the device. From the above, it is evident that the switching diode is selected to have such switching voltage that, at normal temperatures such as 130° F., this voltage is higher than peak applied voltage at the highest line voltage condition, and yet low enough that peak voltage under low line voltage condition is well above the switching voltage at some elevated temperature such as 300° F. and up to 550° F. Note that the higher temperature limit is for the purpose of preventing the diode from deteriorating due to thermal degradation. The diode then is physically mounted in the proximity of the pilot in such location as to exceed the 300° F. temperature when the pilot is lit, hence is switched to its ON condition, and to be cool and therefore switched off when the pilot is out. It is thus impossible, even under thermostat closed condition, to energize the main valve motor if the pilot is out.

It is also of interest that the switching diode is fail-safe in that it will open the circuit if for some reason, such as an insulating external carbon build-up or mechanical bending or breakage of the device or its mounting, the diode becomes cool. Thermal degradation which could be caused by an an inexperienced person bending parts of the pilot to cause overheating would cause increased internal resistance in the device under ON condition, ending ultimately in failure in the high resistance or off mode.

Figure 3:
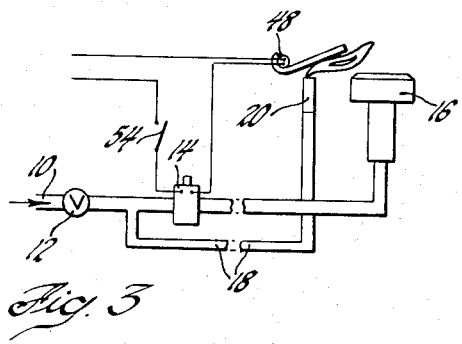
FIG. 3 is a schematic diagram of fuel burner control system embodying the present invention with a main valve control.
Figure 4:
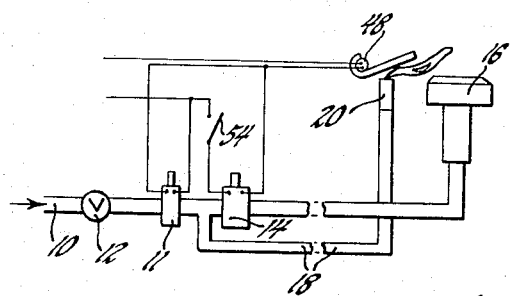
FIG. 4 is a schematic diagram of a fuel burner control system embodying the present invention with a separate safety valve control.

With reference to FIG. 3 of the drawing, the apparatus of a fuel burner control system includes a main conduit 10 being connected to a suitable gas source and having a manual on-off valve 12 for shut off control. A main burner control valve 14 may be of any suitable type having an electric operator, such as a heat motor or an electromagnet and energizing coil. Between the manual valve 12 and the relay valve 14, the main conduit 10 communicates with a branch conduit 18 for supply flow of fuel to a pilot burner 20 which is disposed in igniting proximity to the main burner 16. A similar arrangement is shown in FIG. 4 with the addition of a safety shut-off device 11 providing 100% shut-off of fuel flow; this safety device includes an electromagnetic valve having a holding coil electrically connected in parallel with the main valve thermostatic switch and having a manual reset operating to open the safety valve only. Components for operation of the fuel burner control system will be described hereinafter in connection with the circuit diagrams.

Figure 5:
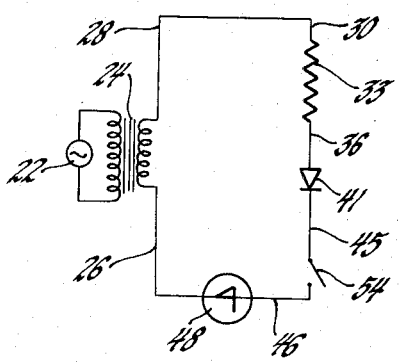
FIG. 5 is a schematic circuit diagram showing a heat motor type of load.

FIG. 5 illustrates a circuit arrangement for a heat motor type actuator which may be used in either system shown in FIGS. 3 and 4. An alternating current source 22 is connected to the primary of a step down transformer 24, the secondary of which is stepped down to 24 volts and includes a pair of conductor leads 26 and 28. A conductor 30 connects one end of a heat motor 33 of the valve 14 to the secondary lead 28; the other end of the heat motor 33 is connected to conductor 36. A rectifier diode 41 is connected to lead 36 and polarized to block reverse direction current flow in the switch 48. The other end of diode 41 is connected through conductor 45, thermostat switch 54, and lead 46 to a four-layer switching diode 48. The four-layer diode 48 is polarized in such direction that its normal conduction is in the direction opposite to that of rectifier diode 41, and its switch ON direction of current flow is such as to be conducted through diode 41 to energize load 33. The other end of four-layer switching diode 48 is connected by conductor 26 to the transformer 24.

Figure 6:
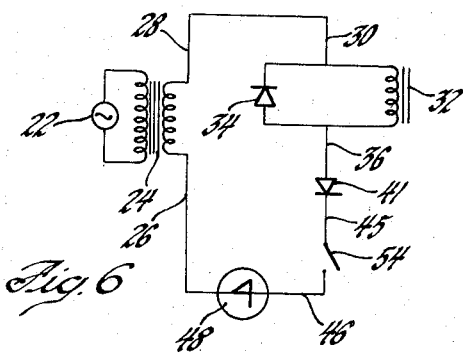
FIG. 6 is a schematic circuit diagram showing a relay motor type of load.

The circuit shown in FIG. 6 is basically the same as that of FIG. 5, except that the valve operator is a relay type instead of a heat motor type. Thus, instead of resistance 33 of FIG. 6, the electrical load consists of relay coil 32 and the "free-wheeling" diode 34 connected in parallel with the coil to absorb the energy fed back into the circuit when the magnetic field in the relay collapses.

In operation of the above systems, it is assumed that the main burner 16 is ignited by the pilot 20 when the main valve 14 is opened by the thermostat 54; thus the switching diode 48 is hot. If the pilot goes out, the diode 48 will cool, opening the circuit to the main valve 14 and preventing it from being reenergized until the pilot 20 has been relighted.

The Shockley diode is utilized as the four-layer diode 48 which defines a four-layer switch that will not switch on under applied voltage at temperatures near normal or high ambient conditions, but which will become conducting at temperatures of the order of those obtainable from a pilot burner flame. Accordingly, the four-layer diode 48 is disposed in the flame of the pilot burner 20 as by attachment to the pilot burner hood and is thereby maintained at conducting temperatures as long as there is a flame at the pilot burner. If for any reason, such as if pilot burner 20 should go out, or accidental breakage of the safety switch mount or switch 48, the diode switch 48 cools and becomes non-conductive, thereby blocking flow of current to the coil 32; then the main valve 14 will close and remain closed as long as the pilot is extinguished, the diode 48 acting as an open safety switch. In order to commence operation of the heating system, the pilot burner 20 must first be relighted to cause switching diode 48 to become hot—hence conductive. As long as this conductive condition exists, the control system effects normal thermostatic operation, cycling in response to operation of the bimetal switch 54.

With the above arrangement, it is now apparent that the switching diode 48 functions as a safety switch that is mounted in thermal proximity to the pilot burner 20. The diode will not switch on under applied voltage at temperatures near normal, or high line voltage or ambient temperature conditions, but will become conducting at temperatures of the order obtained from a pilot burner flame, e.g., about 300° F. to 600° F.

Figure 7:
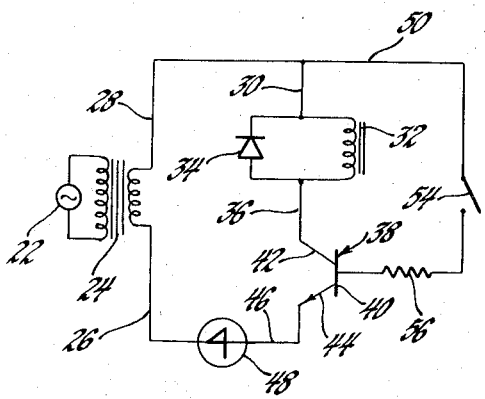
FIG. 7 is a schematic diagram of a transistorized control circuit for the systems shown in FIG. 3.
Figure 8:
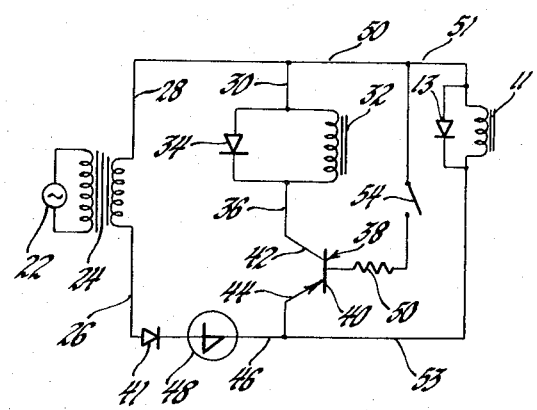
FIG. 8 is a schematic diagram of a transistorized control circuit for the system shown in FIG. 4.

FIGS. 7 and 8 illustrate control circuits similar to FIG. 6 with the addition of a transistor amplifier electrically connected to the switching diode 48 whereby the current load on the contacts of switch 54 may be reduced by using a transistor switch, in which circuit the switching diode 48 may be in either conductor 26, as shown, or alternatively in conductor 50. In FIG. 7, using an NPN transistor 38, it will be necessary to connect the collector 42 to lead 36 and the emitter 44 to lead 46. If a PNP transistor is used, diodes 34 and 48 will be polarized in the reverse direction as shown in FIG. 8. In FIG. 7, since there is a main valve only, diode 41 may be omitted; in FIG. 8, using a separate safety valve 11, diode 41 is still used. For either configuration of transistor 38, the transistor base 40 is connected in parallel to the coil 32 and includes a conductor 50 connected between the secondary lead 28 and a thermostatically actuated switch 54. The switch 54 may be of any conventional type such as a room thermostat type and is shown here as including a bimetal type actuator. The bimetal switch 54 is in turn connected to the transistor base 40 by means of resistor 56 which limits the base current. The system of FIG. 8 utilizes a PNP transistor and also a separate safety valve 11. Note that the switching diode may carry the load of both main valve and safety valve, whereas the (transistor) switch carries the main valve only.

Figure 9:
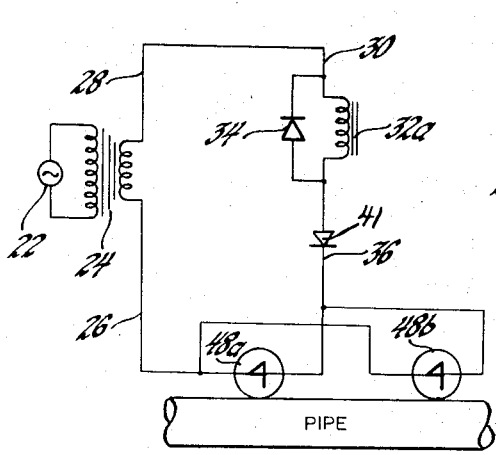
FIG. 9 is a schematic diagram of an overtemperature warning system embodying the present invention.
Figure 10:
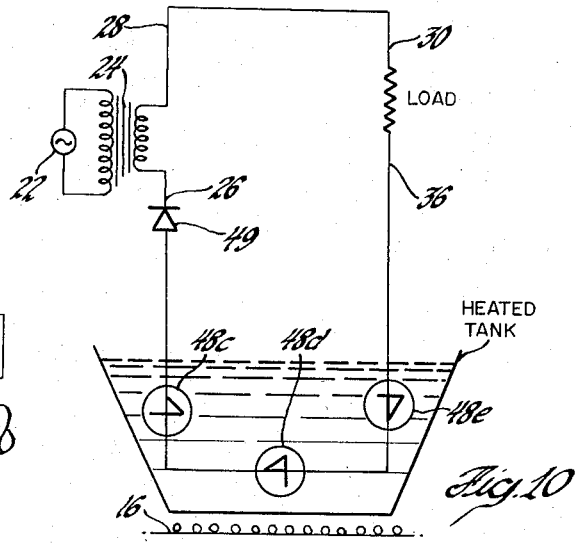
FIG. 10 is a schematic diagram of an undertemperature warning system embodying the present invention.

Another particular application of the present arrangement is illustrated in FIGS. 9 and 10 wherein an overtemperature warning system, respectively, are shown. In FIG. 9 the same type of switching diode is utilized to respond to the temperature of a medium flowing in a pipe. In this case several diodes 48a and 48b are connected in parallel, and used to switch the flow of current to an alarm relay 32a in response to overheat of the pipe which may carry superheated steam, hot air, etc. As long as all diodes are at normal temperature, they are blocking, and the alarm is de-energized. When any one of the diodes becomes overheated, as by excessive temperature of the pipe, the alarm will sound, indicating the dangerous condition.

In FIG. 10, the same type of switching diode is utilized to respond to undertemperature conditions of a solution in a heated tank. In this case, three switching diodes 48a, 48b, and 48c are disposed in a solution tank which is heated by the burner 16; these three diodes are connected in series and a rectifying diode 49 is inserted in the transformer secondary lead 26. Any one of the three diodes will de-energize the load, which may be an audible or visible alarm, thus indicating a cold spot in a system which is supposed to be hot.

Inasmuch as the present invention is subject to many modifications and changes in details, it is intended that all matter contained in the foregoing description or shown on the accompanying drawings shall be interpreted as illustrative and not in a limiting sense.

What is claimed is:

1. In a burner control system, the combination comprising
   a main burner,
   a pilot burner disposed in igniting proximity to said main burner whereby the same is ignited by a pilot burner flame,
   valve means movable between on and off positions to control operation of said main burner,
   electrical means for operating said valve means,
   electric circuit means including a semiconductor amplifier having an output controlling said electrical means, and
   a pilot burner flame responsive safety device including a semiconductor element controlling said semiconductor amplifier,
   said semiconductor element being conductive as long as a flame is present at said pilot burner.

2. The combination as recited in claim 1 wherein said semiconductor element comprises a four-layer switching diode.

3. The combination as recited in claim 2 wherein said semiconductor amplifier comprises a transistor amplifier including a base connected to a biasing system, a collector connected to said electrical means, and an emitter connected to said four-layer switching diode.

4. The combination as recited in claim 3 wherein said biasing system includes thermostatic switch means connected to said base for biasing the same when in a switch closed position.

5. The combination as recited in claim 2 wherein said semiconductor amplifier comprises a transistor amplifier including an emitter connected to a biasing system, a collector connected to said electrical means and a base connected to said four-layer switching diode.

6. In a control system, the combination comprising
   fuel burning apparatus including main and pilot burners,
   valve means controlling said fuel burning apparatus and including an electrical control for operating said valve means,
   an electric circuit for said electrical control including a pair of alternating current leads,
   one of said leads being connected to one side of said electrical control,
   a transistor amplifier having a base, an emitter and a collector connected to the other side of said electrical control,
   thermostatic switch means connected between said one lead and said base for biasing the same, and
   a four-layer switching diode connected between said emitter and the other of said leads,
   said diode being conductive in response to pilot burner operation and being non-conductive when said pilot burner is inoperative.

7. The combination as recited in claim 6 wherein said electrical control includes a relay having an energizing coil and a parallel-connected diode.

8. The combination as recited in claimed 6 wherein said electrical control includes a resistance heat motor.

9. The combination as recited in claim 6 wherein said apparatus includes a safety shut-off means having electrically energized means connected in parallel with said thermostatic switch means.

References Cited
UNITED STATES PATENTS

| | | | |
|---|---|---|---|
| 2,549,633 | 4/1951 | Ottmar | 158—124 X |
| 3,166,680 | 1/1965 | Kevane et al. | 307—88.5 |
| 3,174,528 | 3/1965 | Staring | 158—128 X |
| 3,213,296 | 10/1965 | Enders | 330—23 X |

FREDERICK L. MATTESON, Jr., *Primary Examiner.*

E. G. FAVORS, *Assistant Examiner.*